April 12, 1932.  D. P. WILSON  1,853,482
WASHING MACHINE DRIVE
Filed April 24, 1930
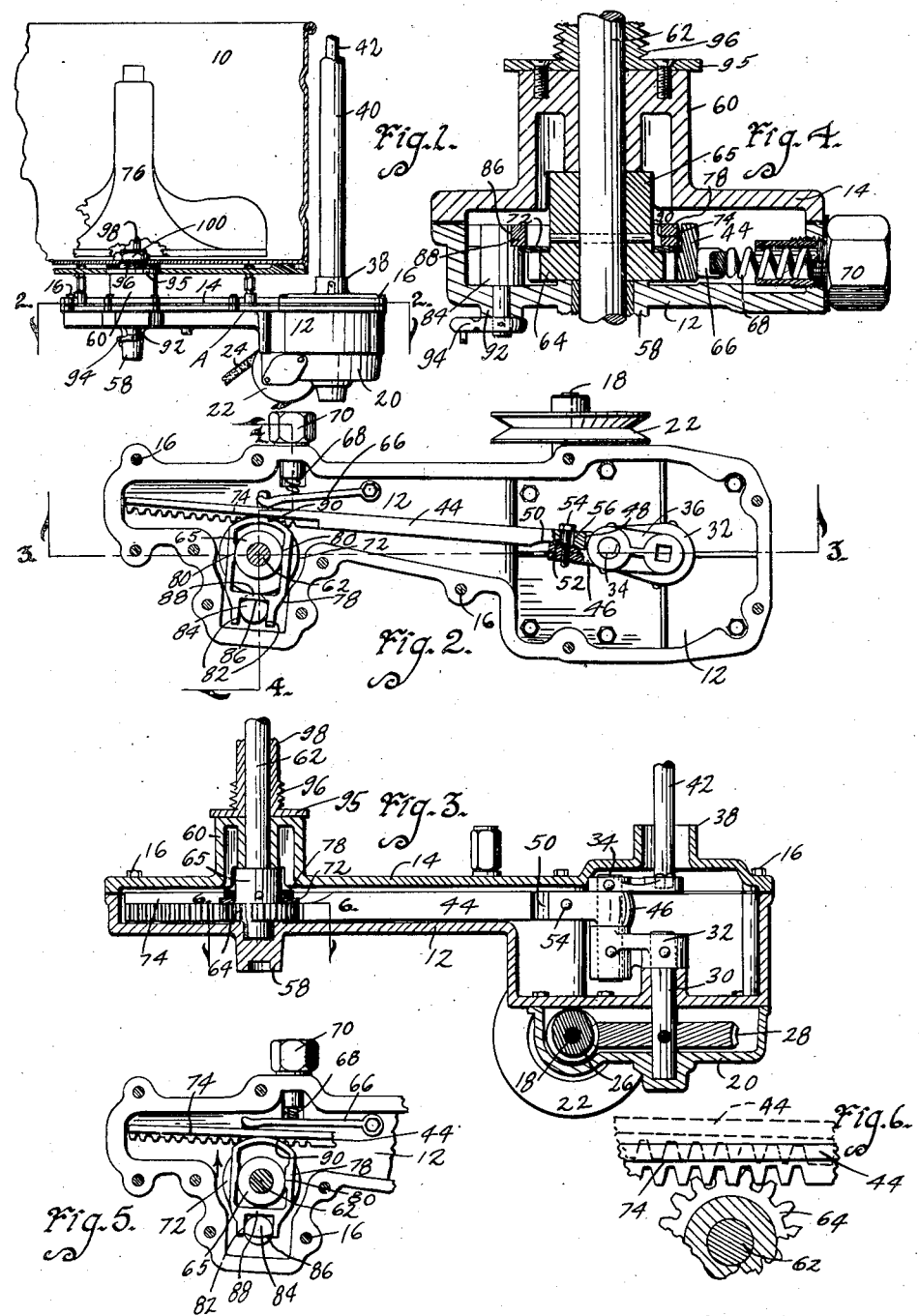
Inventor
Donald P. Wilson
by Bair, Freeman & Sinclair
Attorneys
Witness
Edw. Seeley Patented Apr. 12, 1932

1,853,482

UNITED STATES PATENT OFFICE

DONALD P. WILSON, OF OMAHA, NEBRASKA, ASSIGNOR TO L. M. DECKER CO., OF OMAHA, NEBRASKA

WASHING MACHINE DRIVE

Application filed April 24, 1930. Serial No. 446,983.

The object of this invention is to provide a washing machine drive that is simple, durable and comparatively inexpensive to manufacture.

A further object is to provide a washing machine drive having novel features of construction wherein greater operating efficiency and less wearing of the parts is had and yet the device may be easily operated and thrown into and out of gear.

More particularly, it is my object to provide a washing machine drive consisting of a motor driven crank shaft with a rack bar attached thereto for coaction with a pinion, the pinion being operatively connected with a washing machine dolly.

Another object is to provide a guide surface on the rack bar and a guide washer or circular disk adjacent the pinion, the periphery of which is concentric with the teeth of the pinion, whereby a spring pressure may be exerted against the back of the rack bar and yet the teeth of the bar and the pinion will not mesh too tightly.

Still a further object is to provide a clutch mechanism consisting of a clutch member adapted to engage the guide surface on the rack bar, the clutch member having a cam surface for such engagement and the cam surface being formed on a radius from the center of the pinion when the device is in disengaged position.

Another object is to provide a clutch cam for actuating the clutch member and having a shaft, the clutch member being guided by the dolly shaft or more specifically a hub on the dolly shaft pinion and by the cam shaft.

A further object is to provide a pressure arm, spring pressed against the back side of the rack bar for holding the teeth in mesh and actuating the clutch member to "off" position when the clutch cam is rotated to "off" position.

Still a further object is to provide a novel means of connection between a fitting on the motor driven crank shaft and the rack bar consisting of a shoulder, an inclined surface and a bolt and slot connection, whereby tightening the bolt causes the rack bar to slide longitudinally relative to the inclined surface and engage the shoulder and pulling strain on the rack bar tends to place the bolt under a stretching tension rather than a shearing action as when such parts are connected in the ordinary manner.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a sectional view through a portion of a washing machine showing an outside elevation of my washing machine drive applied thereto.

Figure 2 is an enlarged sectional view on the line 2—2 of Figure 1 and illustrates the operating mechanism of the drive.

Figure 3 is a vertical sectional view on the line 3—3 of Figure 2.

Figure 4 is an enlarged vertical sectional view on the line 4—4 of Figure 2.

Figure 5 is a view similar to the left hand end of Figure 2 illustrating the parts in a different position wherein the clutch member is shown in "off" position; and Figure 6 is an enlarged sectional view on the line 6—6 of Figure 3 illustrating the teeth of the dolly shaft pinion and rack bar in mesh in solid lines and out of mesh in dotted lines.

On the accompanying drawings I have used the reference numeral 10 to indicate a washing machine tub. My washing machine drive A consists of a housing formed of a lower portion 12 and an upper portion 14. The portions 12 and 14 are bolted together by bolts or cap screws 16, a gasket being interposed between the two so that the housing may retain oil or grease for lubrication purposes. The mechanism of my improved drive consists of a drive shaft 18 journaled in a sub housing 20. A pulley 22 is secured to the drive shaft 18 on the outside of the housing 20 and may be operatively connected with an electric or other type of motor (not shown) by means of a belt 24.

Within the housing 20 a worm 26 is secured to the drive shaft 18 and meshes with a worm gear 28. The worm gear 28 is secured to a crank shaft 30 having a crank arm 32. A crank pin 34 is secured to the crank arm 32 and has a secondary crank arm 36 secured to its upper end. On the portion 14 of the housing of my drive a hub 38 is formed and adapted to receive a tubular casing 40 through which a wringer drive shaft 42 extends.

A rack bar 44 is secured to a fitting 46 which in turn is journaled on the crank pin 34. A shoulder 48 is formed on the fitting 46 against which the end of the rack bar 44 engages. The rack bar has an inclined surface 50 for coaction with an inclined surface 52 on the fitting 46 and the bar and fitting are connected together by a bolt or cap screw 54. A slot or enlarged opening 56 is provided in the rack bar 44 for the screw 54. It will be obvious that tightening the screw has a tendency to force the end of the rack bar against the shoulder 48 due to the inclined surfaces 50 and 52, the slot 56 allowing for endwise movement of the bar relative to the fitting. This causes firm engagement between the shoulder 48 and the end of the rack bar 44 so that there is no play when a pushing movement is imparted to the rack bar by the crank shaft. When the crank shaft is pulling the rack bar the inclined surfaces tend to stretch the screw 54 so that instead of a shearing action, a stretching tension is imposed on the screw and in my experience I have found that a screw in such a construction lasts practically indefinitely instead of shearing off as when no inclined surfaces or slot connection are provided.

Journaled in a hub 58 formed on the housing portion 12 and in a hub 60 formed on the housing portion 14 is a dolly shaft 62. A dolly shaft pinion 64 is secured to the shaft 62 and has a hub 65. The teeth of the rack bar 44 are adapted to coact with the teeth of the pinion 64 as best shown in Figure 6. Such coaction is normally caused by a pivoted pressure arm 66 held in engagement with the back of the rack bar by means of a spring 68. The spring 68 extends into a socket nut 70 screwed into the lower portion 12 of the housing for the drive.

To prevent too tight a mesh between the teeth of the bar and pinion I provide a guide washer 72 adapted to engage a guide surface 74 formed along the rack bar 44. The washer 72 is loosely journaled on the hub 65 of the pinion 64 and prevents the ends of the teeth of the rack from engaging the bottoms of the teeth on the pinion and vice versa. Thus proper mesh is insured at all times when the drive is operating. The free end of the friction arm 66 may be provided with a roller if desirable.

In order to disengage the rack bar 44 from the pinion 64 and thus stop the operation of the dolly shaft 62 and the dolly 76 thereon I provide a clutch member 78 having guide faces 80 and 82 adapted to coact with the hub 65 and a clutch cam shaft 84 respectively whereby the clutch member is mounted for longitudinal sliding movement. A cam face 86 is provided on the cam shaft 84 with which a cross bar 88 of the clutch member 78 coacts as shown in Figure 2 when the clutch is in "on" position for allowing the drive to function. In order to disengage the clutch, the clutch cam shaft 84 is given a partial turn as shown in Figure 5 whereby the periphery thereof engages the cross bar 88 for moving the clutch member in the direction of the arrow. In this position a cam surface 90 on the clutch member 78 engages the guide surface 74 of the rack bar and holds the rack bar out of engagement as shown in dotted lines in Figure 6. The cam surface 90 of the clutch member 78 is formed on a radius from the center of the pinion 64 when in the position shown in Figure 5 so as the rack bar when rocked during its reciprocating movement due to the fact that it is driven by a crank its teeth will remain the same distance from the teeth of the pinion 64. The guide surface 74 and guide washer 72 are provided for a similar purpose so that the proper mesh of the teeth may be maintained throughout the entire rocking and reciprocating movement of the rack bar.

The clutch cam shaft 84 is suitably journaled in a hub 92 formed on the lower portion 12 of the casing for the drive and may be provided with a crank 94 for manipulating the clutch. The crank 94 may be connected by a link with an operating handle located at any convenient point such as adjacent the periphery of the tub 10.

Secured to the hub 60 is a flange 95 having a screw threaded portion 96 terminating in a sleeve 98. The screw threaded portion 96 is adapted to extend through an opening in the bottom of the tub 10 and to receive a nut 100. A gasket is interposed between the bottom of the tub 10 and the flange 94 to seal against the leakage of water from the tub 10 around the sleeve 96. The sleeve 98 extends up into the hollow center of the dolly 76 to prevent water from flowing along the dolly shaft 62 and into the housing for the drive A.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a washing machine drive, a dolly shaft, a pinion thereon, a rack bar for coaction therewith, mechanism for reciprocating said rack bar, a guide device adjacent said pinion, a guide surface on said rack bar for coaction therewith, means to normally retain said guide device and guide surface in contact, and a movable member coacting with said guide surface to separate it from said guide device and including a cam surface for coaction with said guide surface.

2. In a washing machine drive, a dolly shaft, a pinion thereon, a rack bar for coaction therewith, mechanism for reciprocating said rack bar, a guide washer on said dolly shaft, a guide surface on said rack bar for coaction therewith, spring means to normally retain said washer and guide surface in contact, and clutch means coacting with said guide surface to separate it from said guide washer, said clutch means including a cam surface for coaction with said guide surface, said cam surface being on a radius from the center of said pinion when in disengaged position.

3. In a washing machine drive, a dolly shaft, a pinion thereon, a rack bar for coaction therewith, mechanism for reciprocating said rack bar, a guide washer on said dolly shaft, a guide surface on said rack bar for coaction therewith, spring means to normally retain said washer and guide surface in contact, and clutch means coacting with said guide surface to separate it from said guide washer, said clutch means comprising a clutch member and a clutch cam, said clutch member being slidably mounted.

4. In a washing machine drive, a dolly shaft, a pinion thereon, a rack bar for coaction therewith, mechanism for reciprocating said rack bar, a guide washer on said dolly shaft, a guide surface on said rack bar for coaction therewith, spring means to normally retain said washer and guide surface in contact, clutch means coacting with said guide surface to separate it from said guide washer, said clutch means comprising a clutch member and a clutch cam, said clutch member being slidably mounted and guided by said dolly shaft and said clutch cam.

5. In a washing machine drive, a dolly shaft, a pinion thereon, a rack bar for coaction therewith, mechanism for reciprocating said rack bar, and clutch means to move said rack bar away from said pinion, said clutch means including a clutch member for coaction with said guide surface, a clutch cam for coaction with said clutch member to thereby move the same upon rotation of the clutch cam, said clutch member having slots, the sides of which coact with said dolly shaft and said clutch cam to thereby guide the clutch member.

6. In a washing machine drive, a dolly shaft, a pinion thereon, a rack bar for coaction therewith, mechanism for reciprocating said rack bar, a guide surface on said rack bar, means to normally retain said rack bar meshed with said pinion and clutch means adapted to coact with said guide surface for disengaging said rack bar from said pinion, said clutch means comprising a slidably mounted clutch member and a clutch cam coactable therewith to slide the same.

7. In a washing machine drive, a dolly shaft, a pinion thereon, a rack bar for coaction therewith, mechanism for reciprocating said rack bar, a guide surface on said rack bar, means to normally retain said rack bar meshed with said pinion and clutch means adapted to coact with said guide surface for disengaging said rack bar from said pinion, said clutch means comprising a slidably mounted clutch member and a clutch cam coactable therewith to slide the same, said clutch member having a pair of slots between which the dolly shaft and the cam are positioned, whereby to guide the clutch member in its sliding movement.

Des Moines, Iowa, August 28, 1929.

DONALD P. WILSON.